(12) United States Patent
Endo et al.

(10) Patent No.: US 10,065,630 B2
(45) Date of Patent: Sep. 4, 2018

(54) CONTROL DEVICE FOR HYBRID VEHICLE, AND HYBRID VEHICLE INCORPORATING CONTROL DEVICE

(71) Applicant: TOYOTA JIDOSHA KABUSHIKI KAISHA, Toyota-shi, Aichi-ken (JP)

(72) Inventors: Hiroki Endo, Nisshin (JP); Masaya Yamamoto, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/278,505

(22) Filed: Sep. 28, 2016

(65) Prior Publication Data

US 2017/0043762 A1  Feb. 16, 2017

Related U.S. Application Data

(63) Continuation of application No. 13/639,635, filed as application No. PCT/JP2010/056297 on Apr. 7, 2010, now Pat. No. 9,493,150.

(51) Int. Cl.
*B60W 20/13* (2016.01)
*F02N 11/08* (2006.01)
(Continued)

(52) U.S. Cl.
CPC ............ *B60W 20/13* (2016.01); *B60K 6/445* (2013.01); *B60K 6/46* (2013.01); *B60L 11/02* (2013.01);
(Continued)

(58) Field of Classification Search
None
See application file for complete search history.

(56) References Cited

U.S. PATENT DOCUMENTS 6,694,232 B2  2/2004  Saito et al.
7,173,396 B2  2/2007  Gunji
(Continued)

FOREIGN PATENT DOCUMENTS

EP    2168828 A1    3/2010
JP    2007-125913 A    5/2007
(Continued)

OTHER PUBLICATIONS

International Search Report dated May 18, 2010 of PCT/JP2010/056297.
(Continued)

*Primary Examiner* — Lail A Kleinman
(74) *Attorney, Agent, or Firm* — Hunton Andrews Kurth LLP (57) ABSTRACT

An ECU includes a running mode control unit, a Wout control unit, and an engine start/stop determination unit. The running mode control unit controls switching of a running mode including a CD mode in which an engine is stopped and running using a motor generator alone is given priority, and a CS mode in which the engine is operated and the SOC of a power storage device is maintained at a predetermined target. The engine start/stop determination unit carries out a start determination of the engine based on a discharge allowable power indicating electric power that can be discharged by the power storage device. The Wout control unit modifies the discharge allowable power based on the running mode and operation/stop of the engine.

6 Claims, 8 Drawing Sheets

(51) Int. Cl.
*B60W 20/00* (2016.01)
*B60K 6/46* (2007.10)
*B60W 10/06* (2006.01)
*B60W 10/08* (2006.01)
*B60W 10/26* (2006.01)
*B60W 50/08* (2012.01)
*B60L 11/02* (2006.01)
*B60K 6/445* (2007.10)

(52) U.S. Cl.
CPC ............ *B60W 10/06* (2013.01); *B60W 10/08* (2013.01); *B60W 10/26* (2013.01); *B60W 20/00* (2013.01); *B60W 50/082* (2013.01); *F02N 11/0818* (2013.01); *B60L 2240/441* (2013.01); *B60W 2510/0638* (2013.01); *B60W 2510/244* (2013.01); *B60W 2710/06* (2013.01); *B60W 2710/086* (2013.01); *B60Y 2200/92* (2013.01); *B60Y 2300/182* (2013.01); *B60Y 2300/43* (2013.01); *B60Y 2300/60* (2013.01); *B60Y 2300/91* (2013.01); *Y02T 10/48* (2013.01); *Y02T 10/6217* (2013.01); *Y02T 10/6239* (2013.01); *Y02T 10/6269* (2013.01); *Y02T 10/6286* (2013.01); *Y10S 903/93* (2013.01)

(56) References Cited

U.S. PATENT DOCUMENTS

| | | |
|---|---|---|
| 7,826,941 B2 | 11/2010 | Hayashi et al. |
| 8,392,042 B2 | 3/2013 | Noiret |
| 9,014,891 B2 | 4/2015 | Takayanagi et al. |
| 9,493,150 B2 | 11/2016 | Endo et al. |
| 2008/0091314 A1 | 4/2008 | Hayashi et al. |
| 2009/0306843 A1 | 12/2009 | Jinno et al. |
| 2010/0100265 A1* | 4/2010 | Kato ............ B60K 6/445 701/22 |
| 2010/0145560 A1 | 6/2010 | Komatsu et al. |
| 2011/0166733 A1 | 7/2011 | Yu et al. |
| 2011/0202223 A1 | 8/2011 | Nefcy et al. |
| 2011/0208383 A1 | 8/2011 | Yamamoto |
| 2013/0024063 A1 | 1/2013 | Yamamoto et al. |

FOREIGN PATENT DOCUMENTS

| | | |
|---|---|---|
| JP | 2007-307995 A | 11/2007 |
| JP | 2008247081 A | 10/2008 |
| JP | 2009-018713 A | 1/2009 |
| JP | 2009-166513 A | 7/2009 |
| JP | 2009166513 A * | 7/2009 |
| JP | 2009-248860 A | 10/2009 |
| JP | 2009274479 A | 11/2009 |
| JP | 2009-292287 A | 12/2009 |
| JP | 2009280170 A | 12/2009 |
| JP | 2009292261 A | 12/2009 |
| JP | 2010069923 A | 2/2010 |
| JP | 2010083394 A | 4/2010 |
| JP | 5429366 B2 | 2/2014 |
| WO | 2011/125184 A1 | 10/2011 |

OTHER PUBLICATIONS

Office Action dated Jun. 27, 2014 in U.S. Appl. No. 13/643,941.
Notice of Allowance dated Dec. 26, 2014 in U.S. Appl. No. 13/643,941.

* cited by examiner

| | CD MODE | CS MODE |
|---|---|---|
| ENGINE CURRENTLY STOPPED | INCREASE | NON-INCREASE |
| ENGINE CURRENTLY OPERATING | NON-INCREASE | NON-INCREASE |

FIG.7

| CD MODE | CS MODE |
|---|---|
| Wout INCREASED VALUE | Wout NON-INCREASED VALUE |

CONTROL DEVICE FOR HYBRID VEHICLE, AND HYBRID VEHICLE INCORPORATING CONTROL DEVICE

This is a Continuation of U.S. patent application Ser. No. 13/639,635, filed on 5 Oct. 2012, which is a 371 national phase application of PCT/JP2010/056297 filed 7 Apr. 2010, the contents of which are incorporated herein by reference.

TECHNICAL FIELD

The present invention relates to a control device for a vehicle, and a hybrid vehicle incorporating the control device. Particularly, the present invention relates to a control device for a hybrid vehicle incorporating an internal combustion engine and an electric motor as the power source, and a hybrid vehicle incorporating the control device.

BACKGROUND ART

Hybrid vehicles are attracting attention as environment-friendly vehicles. A hybrid vehicle incorporates a power storage device, an inverter, and an electric motor driven by the inverter, in addition to a conventional internal combustion engine, as the power source for traction.

Japanese Patent Laying-Open No. 2009-166513 (PTL 1) discloses the method for suppressing overdischarge of a power storage device reliably in such a hybrid vehicle. This hybrid vehicle is switched between an HV running mode and an EV running mode according to the required driving force based on the output from various sensors. When there is a switching request to the HV running during execution of the EV running mode, the engine is cranked by a motor generator receiving electric power from the power storage device to start the engine. A discharge allowable power Wout is provided such that the voltage of the power storage device does not become lower than the lower limit voltage, and a torque command value Tref is adjusted such that the motor consumption power does not exceed the provided discharge allowable power Wout. When the accelerator pedal position reaches a predetermined reference value within a predetermined period of time from requesting switching to the HV running mode, the lower limit voltage is temporarily raised.

According to this hybrid vehicle, the power storage device can reliably be protected from overdischarge. As a result, the charging/discharging capability of the power storage device can be exhibited sufficiently to allow the running performance and fuel consumption performance of the vehicle to be improved (refer to PTL 1).

CITATION LIST

Patent Literature

PTL 1: Japanese Patent Laying-Open No. 2009-166513

SUMMARY OF INVENTION

Technical Problem

There is a demand for a hybrid vehicle to run in a state where the internal combustion engine is stopped as much as possible. Recently, attention is focused on the so-called plug-in hybrid vehicle that allows a vehicle-mounted power storage device to be charged from a power supply external to the vehicle. The aforementioned demand is particularly immense in such plug-in hybrid vehicles.

The more the vehicle runs using only the electric motor with the internal combustion engine stopped (hereinafter, such running is also referred to as "EV (Electric Vehicle) running", whereas running with the internal combustion engine operated is referred to as "HV (Hybrid Vehicle) running"), the greater heat load on electrical components. In this case, increasing the heat resistance of the electrical components may be a possible countermeasure. However, this is not the best plan since increasing the heat resistance of electrical components may induce a great increase in cost.

In view of the foregoing, an object of the present invention is to allow EV running to be extended while giving consideration to the heat load on electrical components in a hybrid vehicle.

Solution to Problem

According to the present invention, a control device for a hybrid vehicle includes a running mode control unit, a determination unit, and a discharge allowable power control unit. The hybrid vehicle includes an internal combustion engine generating vehicle driving force, a power storage device capable of being charged and discharged, and an electric motor receiving supply of electric power from the power storage device to generate vehicle driving force. The running mode control unit controls switching of a running mode including a first mode (CD mode) in which the internal combustion engine is stopped and running using the electric motor alone is given priority, and a second mode (CS mode) in which the internal combustion engine is operated and the state of charge indicating a charging state of the power storage device is maintained at a predetermined target. The determination unit carries out a start determination of the internal combustion engine based on a discharge allowable power (Wout) indicating the electric power that can be discharged by the power storage device. The discharge allowable power control unit modifies the discharge allowable power based on the running mode and operation/stop of the internal combustion engine.

Preferably, when the running mode is at the first mode and the internal combustion engine is stopped, the discharge allowable power control unit increases the discharge allowable power than when the running mode is at the first mode and the internal combustion engine is operating, or than when the running mode is at the second mode.

Further preferably, the hybrid vehicle further includes a charging device configured to receive supply of electric power from a power supply external to the vehicle for charging the power storage device. The running mode control unit sets the running mode at the first mode after the power storage device is charged by the charging device.

Preferably, the determination unit carries out a stop determination of the internal combustion engine based on the discharge allowable power increased by the discharge allowable power control unit when the running mode is at the first mode and the internal combustion engine is operating.

Preferably, the control device for a hybrid vehicle further includes a rate processing unit. The rate processing unit modifies the discharge allowable power at a predetermined rate when the discharge allowable power is to be modified.

Preferably, the discharge allowable power control unit maintains the discharge allowable power when the internal combustion engine is started during modification of the discharge allowable power.

Also preferably, the discharge allowable power control unit maintains the discharge allowable power when the internal combustion engine is started at the time of switching the running mode.

Preferably, the modifying rate of the discharge allowable power when returning from increase of the discharge allowable power is smaller than the modifying rate of the discharge allowable power when increasing the discharge allowable power.

Preferably, the modifying rate of the discharge allowable power when increasing the discharge allowable power is greater than the modifying rate of the discharge allowable power when returning from increase of the discharge allowable power.

Preferably, the control device for a hybrid vehicle further includes a temporary-increase processing unit. The temporary-increase processing unit temporarily increases the discharge allowable power when the internal combustion engine is started. When the discharge allowable power is increased by the discharge allowable power control unit, the temporary-increase processing unit sets processing of temporarily increasing the discharge allowable power non-executable.

According to the present invention, the hybrid vehicle includes any of the control devices set forth above.

Advantageous Effects of Invention

In the present invention, the discharge allowable power (Wout) is modified based on the running mode and operation/stop of the internal combustion engine. When the running mode is at the first mode (CD mode) and the internal combustion engine is stopped, the discharge allowable power can be increased as compared to the case where the running mode is at the first mode and the internal combustion engine is operating, or the case where the running mode is at the second mode (CS mode). Therefore, the running power during EV running can be ensured, and increase of the heat load on electrical components can be suppressed when the internal combustion engine is operating and when in the second mode. Thus, the present invention allows EV running to be extended while giving consideration to the heat load on electrical components.

DESCRIPTION OF EMBODIMENTS

Embodiments of the present invention will be described in detail hereinafter with reference to the drawings. In the drawings, the same or corresponding elements have the same reference characters allotted, and description thereof will not be repeated.

Figure 1:
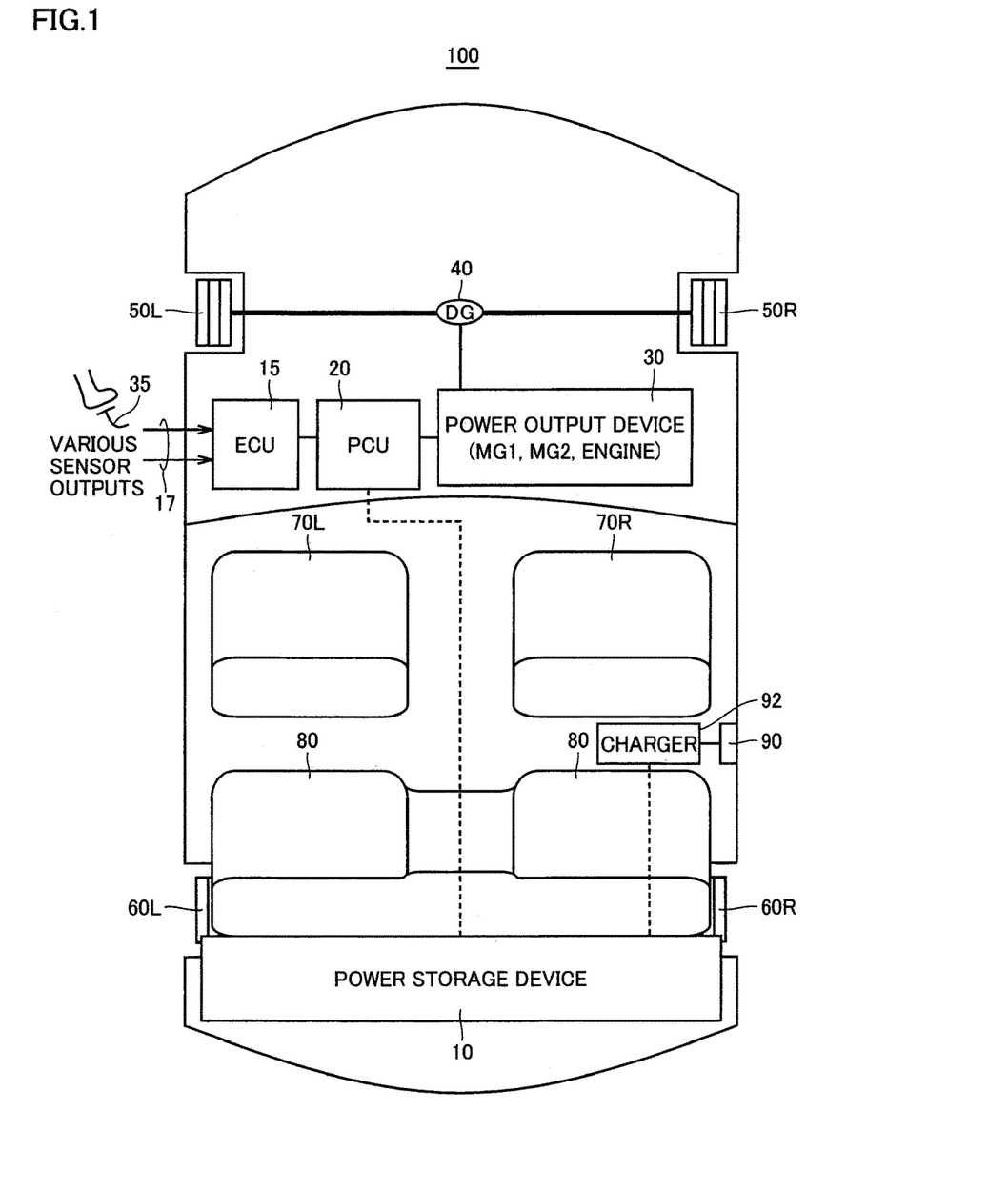
FIG. 1 is a block diagram representing an entire configuration of a hybrid vehicle to which a control device according to an embodiment of the present invention is applied.

FIG. 1 is a block diagram representing an entire configuration of a hybrid vehicle to which a control device according to an embodiment of the present invention is applied. Referring to FIG. 1, a hybrid vehicle 100 includes a power storage device 10, an ECU (Electronic Control Unit) 15, a PCU (Power Control Unit) 20, a power output device 30, and a differential gear (hereinafter, also referred to as DG) 40. Hybrid vehicle 100 further includes front wheels 50L and 50R, rear wheels 60L and 60R, front seats 70L and 70R, a rear seat 80, a charging inlet 90, and a charger 92.

Power storage device 10 is a rechargeable DC power source, formed of a secondary battery such as nickel-metal hydride or lithium ion. Power storage device 10 is disposed at a rear side region of rear seat 80 for example, and electrically connected with PCU 20 to supply DC voltage thereto. Power storage device 10 receives electric power generated by power output device 30 from PCU 20 to be charged. Power storage device 10 is also charged by a charger 92 connected to a charging inlet 90 and receiving electric power supplied from a power supply external to the vehicle. Hereinafter, the power supply external to the vehicle is referred to as "external power supply", and the charging of power storage device 10 by the external power supply is referred to as "external charging".

PCU 20 generically shows a power converter required in hybrid vehicle 100. PCU 20 includes a converter boosting the voltage supplied from power storage device 10, an inverter driving a motor generator included in power output device 30, and the like.

ECU 15 receives various sensor outputs 17 from various types of sensors indicating the driving state and vehicle state. Various sensor outputs 17 include the accelerator pedal position corresponding to the stepping amount on an accelerator pedal 35, the vehicle speed according to the rotational speed of the wheels, and the like. ECU 15 executes various control related to hybrid vehicle 100 based on such sensor outputs applied.

Power output device 30 is provided as the driving source of the wheels, and includes motor generators MG1 and MG2 and an engine. These components are mechanically coupled via a power split device (not shown). In accordance with the running state of hybrid vehicle 100, distribution and coupling of the driving force are implemented among the aforementioned three components via the power split device. As a result, front wheels 50L and 50R are driven. DG 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via DG 40 to drive front wheels 50L and 50R. Power output device 30 receives the rotational force of the motor generator by front wheels 50L and 50R to generate power and provide the generated power to PCU 20.

Motor generators MG1 and MG2 may function as a power generator and an electric motor. Motor generator MG1 operates mainly as a power generator, and motor generator MG2 operates mainly as an electric motor. Specifically, motor generator MG1 receives some of the output from the engine distributed by the power split device for generating power. Motor generator MG1 receives supply of electric power from power storage device 10 to operate as an electric motor for cranking up and starting the engine.

Motor generator MG2 is driven by at least one of the electric power stored at power storage device 10 and the electric power generated by motor generator MG1. The driving force of motor generator MG2 is transmitted to the driving shaft of front wheels 50L and 50R via DG 40. Accordingly, motor generator MG2 assists the engine for driving the vehicle, or for driving the vehicle by its own driving force alone. In a vehicle braking mode, motor generator MG2 is driven by front wheels 50L and 50R to operate as a power generator. At this stage, the electric power generated by motor generator MG2 charges power storage device 10 via PCU 20.

PCU 20 responds to a control instruction from ECU 15 to boost the DC voltage received from power storage device 10, and convert the boosted DC voltage into AC voltage to drive motor generators MG1 and MG2 in power output device 30. In a regenerative operation mode of motor generators MG1 and MG2, PCU 20 responds to a control instruction from ECU 15 to convert the AC voltage generated by motor generators MG1 and MG2 into DC voltage for charging power storage device 10.

Charging inlet 90 is configured to allow connection with the connector of a charging cable (not shown) connected to an external power supply. At the time of external charging, electric power is received from an external power supply connected to charging inlet 90. The received electric power is supplied to charger 92. Charger 92 located between charging inlet 90 and power storage device 10 converts the electric power supplied from the external power supply connected to charging inlet 90 to the level of the voltage of power storage device 10 for output thereto.

Figure 2:
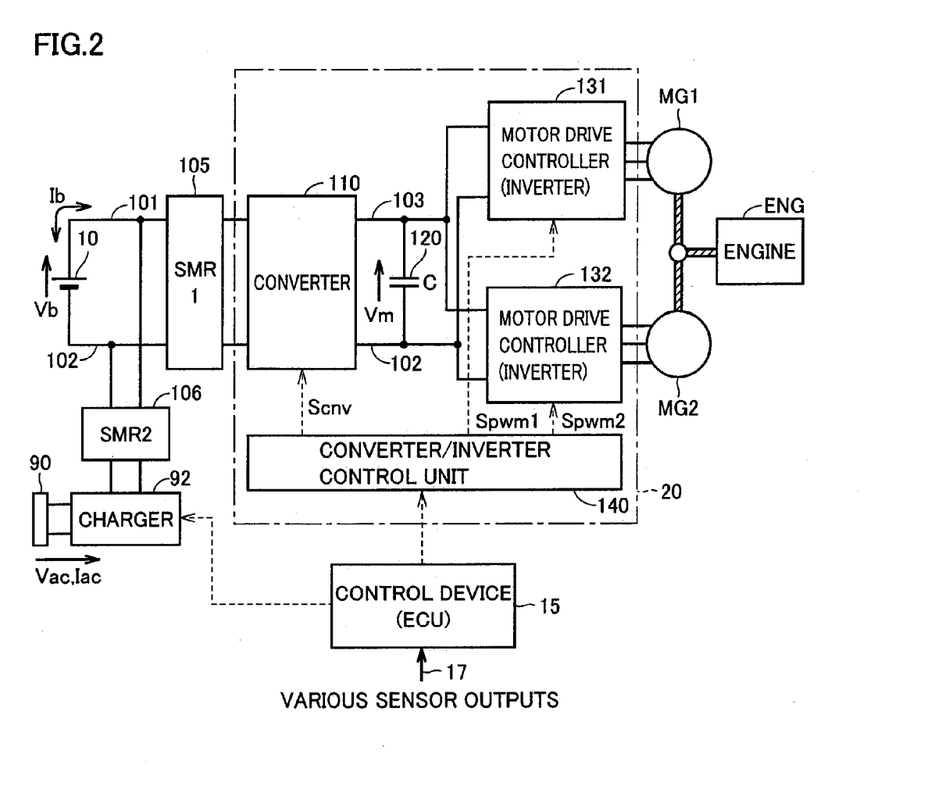
FIG. 2 is a block diagram representing a configuration of an electric system of the hybrid vehicle of FIG. 1.

FIG. 2 is a block diagram representing a configuration of the electric system of hybrid vehicle 100 shown in FIG. 1. Referring to FIG. 2, the electric system includes power storage device 10, SMRs (System Main Relay) 105 and 106, PCU 20, motor generators MG1 and MG2, ECU 15, charging inlet 90, and charger 92.

Motor generators MG1 and MG2 are connected to an engine ENG and driving wheels not shown (front wheels 50L and 50R of FIG. 1) via the power split device. Hybrid vehicle 100 can run using engine ENG and motor generator MG2. Motor generator MG1 starts engine ENG and generates electric power using the driving force of engine ENG.

SMR 105 is provided between power storage device 10 and PCU 20, and is set on in response to a command from ECU 15 in the event of a vehicle running. SMR 106 is provided between power storage device 10 and charger 92, and is set on according to a command from ECU 15 in the event of an external charging.

PCU 20 includes a converter 110, a capacitor 120, motor drive controllers 131 and 132, and a converter/inverter control unit 140. In the present embodiment, motor generators MG1 and MG are AC motors, and motor drive controllers 131 and 132 are formed of inverters. Hereinafter, motor drive controller 131 (132) is also referred to as "inverter 131 (132)".

Converter 110 boosts a voltage Vm between a positive line 103 and a negative line 102 to a level greater than or equal to voltage Vb of power storage device 10 based on a control signal Scnv from converter/inverter control unit 140. Converter 110 is constituted of a current invertible type boost chopper circuit.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on control command values received from ECU 15 (the target value of voltage Vm, the torque target value of motor generators MG1, MG2, and the like). Converter/inverter control unit 140 outputs the generated control signals Scnv, Spwm1 and Spwm2 to converter 110, inverter 131, and inverter 132, respectively.

According to various sensor outputs 17, ECU 15 carries out various control such as controlling the running mode of hybrid vehicle 100, engine ENG start/stop determination, charging and discharging control of power storage device 10, and the like. ECU 15 generates a control command value to drive PCU 20, and provides the generated control command value to converter/inverter control unit 140 of PCU 20. ECU 15 generates and provides to charger 92 a signal for driving charger 92 in external charging.

Figure 3:
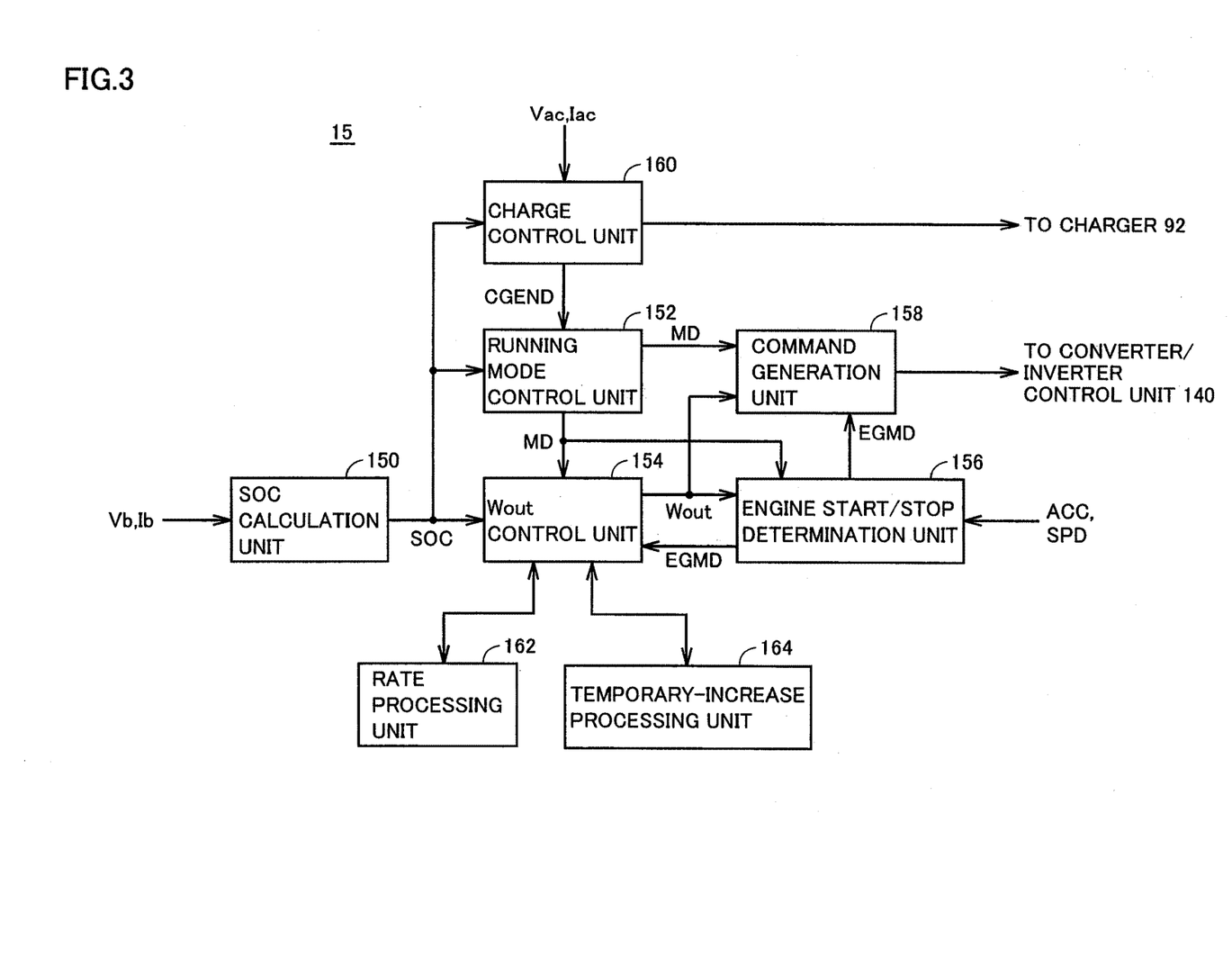
FIG. 3 is a functional block diagram of the ECU in FIG. 2.

FIG. 3 is a functional block diagram of ECU 15 in FIG. 2. Referring to FIG. 3, ECU 15 includes an SOC calculation unit 150, a running mode control unit 152, a Wout control unit 154, and an engine start/stop determination unit 156. ECU 15 further includes a command generation unit 158, a charge control unit 160, a rate processing unit 162, and a temporary-increase processing unit 164.

SOC calculation unit 150 calculates the SOC (state of charge) indicating the charging state of power storage device 10 based on voltage Vb and current Ib of power storage device 10 detected by a sensor not shown. The SOC represents in 0-100% the stored amount relative to a fully charged state of power storage device 10, and indicates the remaining stored amount in power storage device 10. For the method of calculating this SOC, various well-known methods can be employed.

Running mode control unit 152 controls the switching of the vehicle running mode based on the SOC calculated by SOC calculation unit 150. Specifically, running mode control unit 152 controls the switching to a CD (charge depleting) mode in which engine ENG is stopped and running using motor generator MG2 alone is given priority, or a CS (charge sustaining) mode in which engine ENG is operated and the SOC of power storage device 10 is maintained at a predetermined target.

Even in the CD mode, the operation of engine ENG is allowed such as when the accelerator pedal is stepped on greatly by the driver, when an engine driving type air conditioner is operated, when in an engine warm-up state, or the like. The CD mode corresponds to a running mode in which the electric power stored in the power storage device 10 is basically used as the energy source for running the vehicle without maintaining the SOC of power storage device 10. During the CD mode, the ratio of discharging is eventually relatively greater than charging. In contrast, the CS mode is a running mode in which engine ENG is operated as necessary and power is generated by motor generator MG1 for maintaining the SOC of power storage device 10 at a predetermined target level, and is not limited to running with engine ENG always operated.

In other words, even if the running mode is at the CD mode, engine ENG will be operated if the accelerator pedal is stepped on greatly and large vehicle power is required. Furthermore, even if the running mode is at the CS mode, engine ENG will stop when the SOC exceeds the target value. Thus, irrespective of these running modes, running with engine ENG stopped and using motor generator MG2 alone is referred to as "EV running", whereas running with engine ENG operated and using motor generator MG2 and engine ENG is referred to as "HV running".

Figure 4:
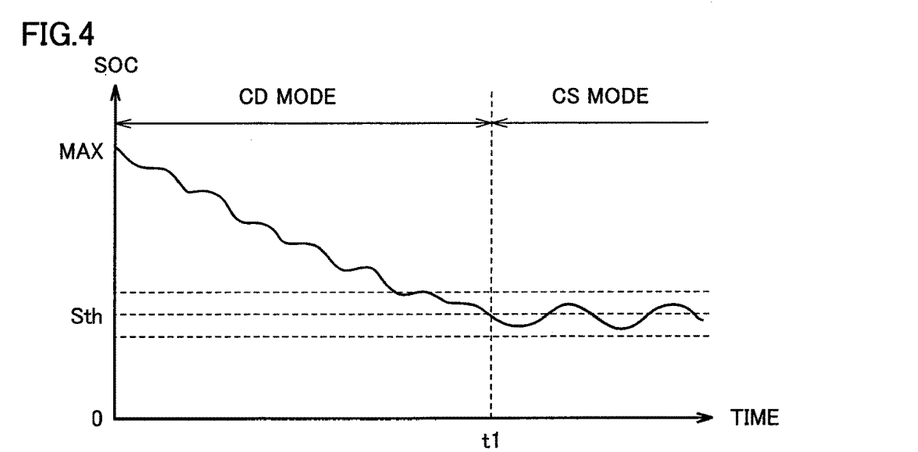
FIG. 4 represents the relationship between the change in SOC of the power storage device and the running mode.

FIG. 4 represents the relationship between the change in the SOC of power storage device 10 and the running mode. Referring to FIG. 4, it is assumed that running is started after power storage device 10 attains a fully charged state (SOC=MAX) by external charging. Following external charging, the running mode is set at the CD mode. During running in a CD mode, the SOC generally decreases in accordance with increase of the running distance although the SOC may temporarily be increased by the regenerative electric power generated at the time of speed reduction or the like. When the SOC attains a threshold value Sth at time t1, the running mode is switched to the CS mode, and the SOC is regulated at the vicinity of threshold value Sth.

Referring to FIG. 3 again, running mode control unit 152 sets the running mode at the CD mode upon receiving a charging end signal CGEND indicating the termination of external charging from charge control unit 160. Then, running mode control unit 152 outputs a mode signal MD indicating whether the running mode is at the CD mode or CS mode to Wout control unit 154, engine start/stop determination unit 156, and command generation unit 158.

Wout control unit 154 receives the SOC of power storage device 10 from SOC calculation unit 150 and mode signal MD indicating the running mode from running mode control unit 152. Wout control unit 154 receives an engine mode signal EGMD indicating whether engine ENG is operated or stopped from engine start/stop determination unit 156. Based on these signals, Wout control unit 154 calculates discharge allowable power Wout indicating the electric power (W) that can be discharged from power storage device 10.

Figure 5:
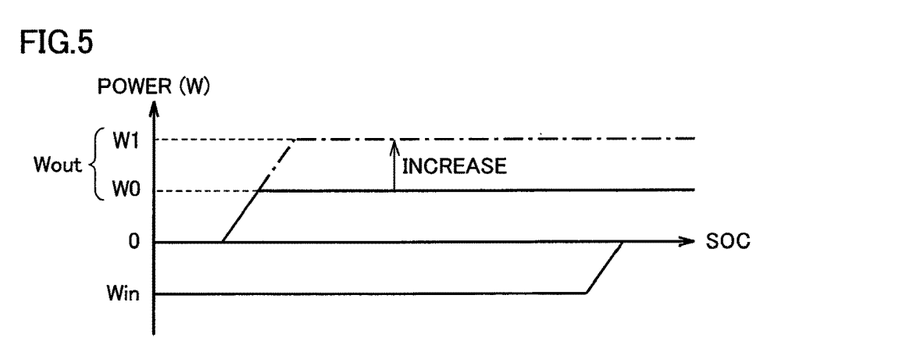
FIG. 5 represents the discharge allowable power of the power storage device.

FIG. 5 represents discharge allowable power Wout of power storage device 10. Referring to FIG. 5, discharge allowable power Wout represents the maximum level of the electric power (W) that can be output from power storage device 10. When the SOC of power storage device 10 decreases, discharge allowable power Wout is controlled to prevent overdischarging.

In the present embodiment, discharge allowable power Wout is modified based on the vehicle running mode and operation/stop of engine ENG, as will be described afterwards. Specifically, when the running mode is at the CD mode and engine ENG is operated, or when the running mode is at the CS mode, discharge allowable power Wout is set at the default value of W0. When the running mode is at the CD mode and engine ENG is stopped, discharge allowable power Wout is increased from W0 to a predetermined W1.

Charging allowable power Win is the maximum value of electric power (W) that can be input to power storage device 10. Charging allowable electric power Win is restricted when the SOC of power storage device 10 becomes high to prevent overdischarging.

Referring to FIG. 3 again, Wout control unit 154 calculates discharge allowable power Wout (default value W0) based on the SOC of power storage device 10, the temperature, and the like using a map prepared in advance. Wout control unit 154 modifies discharge allowable power Wout based on the running mode indicated by mode signal MD received from running mode control unit 152 and engine ENG operation/stop indicated by engine mode signal EGMD signal from engine start/stop determination unit 156.

Figure 6:
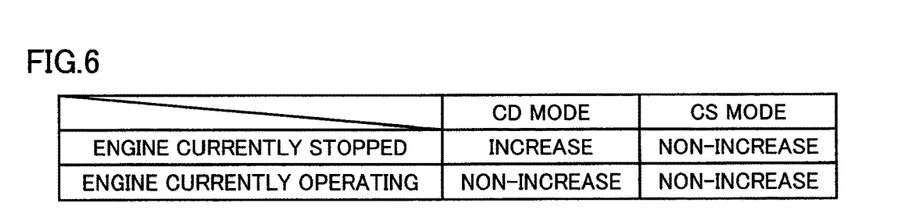
FIG. 6 is a diagram to describe increase/non-increase of the discharge allowable power according to the running mode and operation/stop of the engine.

As shown in FIG. 6, when the running mode is at the CD mode and engine ENG is stopped, Wout control unit 154 increases discharge allowable power Wout from W0 to predetermined W1 (FIG. 5). In contrast, when the running mode is at the CD mode and engine ENG is operated, or when the running mode is at the CS mode, Wout control unit 154 does not increase discharge allowable power Wout.

The reason why discharge allowable power Wout is increased when the running mode is at the CD mode and engine ENG is stopped is to minimize the starting frequency of engine ENG to extend EV running. In other words, when the accelerator pedal is stepped on and the vehicle required power exceeds discharge allowable power Wout even if the running mode is at the CD mode, engine ENG is started and the vehicle is switched from EV running to HV running to satisfy the required power.

However, the driver cannot enjoy the sense of EV running sufficiently if engine ENG is frequently started in response to stepping on the accelerator pedal. The present embodiment is directed to improving the sense of EV running by increasing discharge allowable power Wout to suppress the frequency of starting engine ENG when the running mode is at the CD mode and engine ENG is stopped.

In the present embodiment, discharge allowable power Wout is not always increased. Discharge allowable power Wout is not increased when the running mode is at the CD mode and engine ENG is operated, or when the running mode is at the CS mode. This is to suppress increase of the heat load on electrical components (mainly converter 110), and to avoid the change in the vehicle acceleration property between applying or not applying the present embodiment when the engine is operated and when running in the CS mode.

Referring to FIG. 3 again, Wout control unit 154 outputs to engine start/stop determination unit 156 and command generation unit 158 discharge allowable power Wout subjected to the modification set forth above based on the running mode and engine ENG operation/stop. Further, when discharge allowable power Wout is increased, i.e. the running mode is at the CD mode and engine ENG is stopped, Wout control unit 154 notifies temporary-increase processing unit 164 (described afterwards) that the discharge allowable power Wout is increased.

Engine start/stop determination unit 156 receives discharge allowable power Wout from Wout control unit 154. Engine start/stop determination unit 156 receives mode signal MD indicating the running mode from running mode control unit 152. Engine start/stop determination unit 156 carries out a start determination and stop determination of engine ENG based on the running mode and discharge allowable power Wout.

Figure 7:
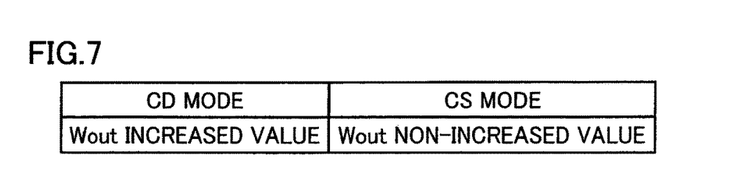
FIG. 7 represents the discharge allowable power used in an engine stop determination.

Specifically, engine start/stop determination unit 156 calculates the vehicle required power based on an accelerator pedal position ACC, vehicle speed SPD, and the like received as various sensor outputs 17 (FIG. 1). As shown in FIG. 7, when the running mode is at the CD mode, engine start/stop determination unit 156 calculates the maximum power that can be output from motor generator MG2 based on the increased discharge allowable power Wout (W1 in FIG. 5), and carries out a start determination and stop determination of engine ENG based on the comparison result between the calculated maximum power and vehicle required power.

In other words, although the discharge allowable power Wout is non-increased (default value W0) during operation of engine ENG when the running mode is at the CD mode (FIG. 6), as set forth above, increased discharge allowable power Wout (W1) is used for the stop determination of engine ENG. Accordingly, the stopping of engine ENG is facilitated after engine ENG is started in a CD mode, allowing the sense of EV running to be further improved.

When the running mode is at the CS mode, engine start/stop determination unit 156 calculates the maximum power of motor generator MG2 based on the non-increased discharge allowable power Wout (W0), and carries out a start determination and stop determination of engine ENG based on the comparison result between the calculated maximum power and vehicle required power.

Referring to FIG. 3 again, command generation unit 158 generates a control command value for driving PCU 20 (for example, target value of voltage Vm, torque target value of motor generators MG1, MG2, and the like), based on the running mode, discharge allowable power Wout, and the engine mode indicating the operation/stop state of engine ENG. Command generation unit 158 outputs the generated control command value to converter/inverter control unit 140 (FIG. 2) of PCU 20.

When an external power supply is connected to charging inlet 90 (FIG. 2), charge control unit 160 generates and provides to charger 92 a control signal for driving charger 92, based on an input voltage Vac and input current Iac detected by sensors not shown. When the SOC of power storage device 10 received from SOC calculation unit 150 reaches a predetermined upper limit value, charge control unit 160 ends the charging control and outputs a charging end signal CGEND indicating the end of charging to running mode control unit 152. Accordingly, the running mode is set at the CD mode at running mode control unit 152, as described above.

Rate processing unit 162 applies rate processing to the modification of discharge allowable power Wout when discharge allowable power Wout is increased from W0 to W1 and when discharge allowable power Wout returns to W0 from W1 at Wout control unit 154. At this stage, rate processing unit 162 sets the modifying rate when discharge allowable power Wout returns to W0 from W1 smaller than the modifying rate when discharge allowable power Wout is increased from W0 to W1. Accordingly, the exceedance of the discharging electric power from power storage device 10 over discharge allowable power Wout due to the delay in the followability of electric power control can be suppressed.

In other words, rate processing unit 162 sets the modifying rate when discharge allowable power Wout is increased from W0 to W1 greater than the modifying rate when discharge allowable power Wout is returned to W0 from W1. Thus, the hold-off state of the vehicle caused by insufficient output when switching from the HV running to EV running in a CD mode can be prevented.

Temporary-increase processing unit 164 temporarily increases discharge allowable power Wout of power storage device 10 when a great amount of electric power is temporarily required such as when engine ENG is to be cranked up by motor generator MG1. When temporary-increase processing unit 164 has received a notification indicating that discharge allowable power Wout is currently increased from Wout control unit 154, the temporary-increasing processing of discharge allowable power Wout is set non-executable. This is because the increasing processing by temporary-increase processing unit 164 is not required since discharge allowable power Wout is already increased by Wout control unit 154.

When engine ENG is started during modification of discharge allowable power Wout (that is, when increasing from W0 to W1, or when returning to W0 from W1), it is desirable that discharge allowable power Wout is maintained during startup of engine ENG at Wout control unit 154. Also, when engine ENG is started at the time of switching the running mode (when switching from a CD mode to CS mode, or from a CS mode to CD mode), it is desirable that discharge allowable power Wout is maintained during startup of engine ENG. By way of example, the value of discharge allowable power Wout is maintained at the value corresponding to when start-up of engine ENG is initiated. Accordingly, the engine starting processing is stabilized since the electric power output from power storage device 10 at the time of starting engine ENG is stable.

Figure 8:
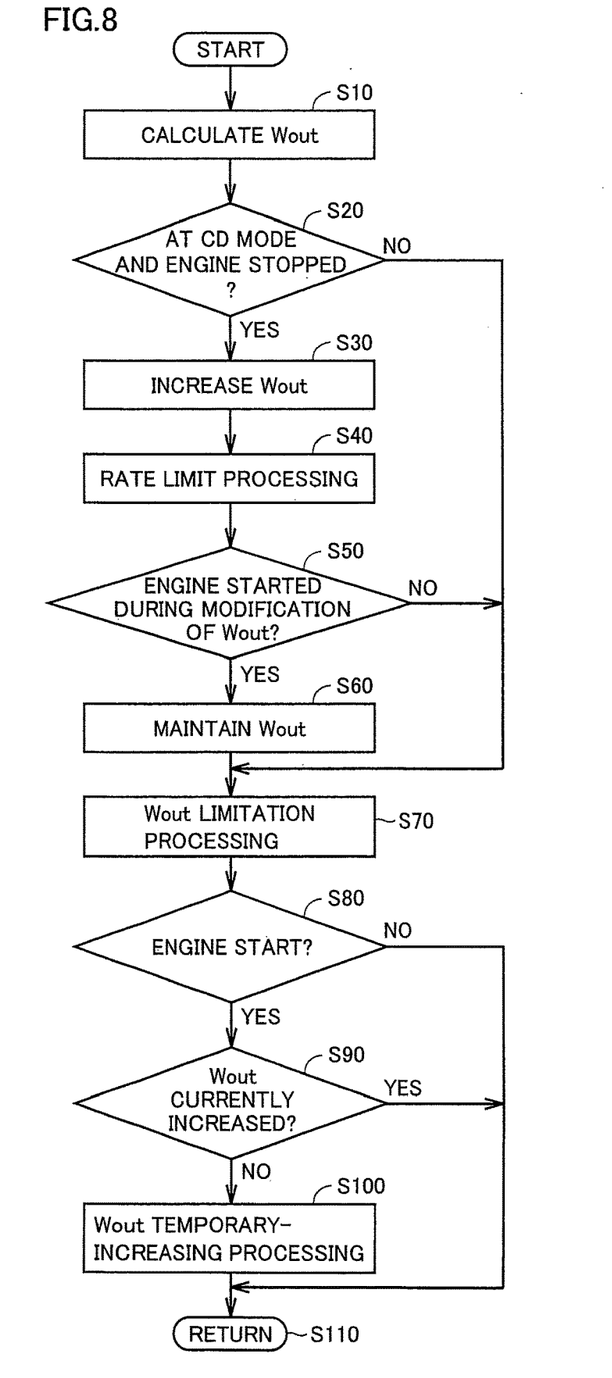
FIG. 8 is a flowchart to describe a series of procedures related to control of the discharge allowable power.

FIG. 8 is a flowchart to describe a series of procedures related to control of discharge allowable power Wout. Referring to FIG. 8, ECU 15 uses a map or the like prepared in advance to calculate discharge allowable power Wout (default value W0) (step S10).

Then ECU 15 determines whether the running mode is at the CD mode, and engine ENG is stopped (step S20). When a determination is made that the running mode is not at the CD mode (i.e. in a CS mode), or when engine ENG is operating (NO at step S20), ECU 15 proceeds to the processing of step S70 that will be described afterwards.

When a determination is made that the running mode is at the CD mode and engine ENG is stopped at step S20 (YES at step S20), ECU 15 increases discharge allowable power Wout from W0 to a predetermined W1, as shown in FIG. 5 (step S30).

When discharge allowable power Wout is to be modified, ECU 15 executes rate limit processing in which the modifying rate of discharge allowable power Wout is limited (step S40). Further, ECU 15 determines whether a starting request of engine ENG is made during modification of discharge allowable power Wout (step S50). When a determination is made that starting of engine ENG is required during modification of discharge allowable power Wout (YES at step S50), ECU 15 maintains discharge allowable power Wout (step S60). By way of example, discharge allowable power Wout is maintained at a value corresponding to when start-up of engine ENG is requested.

Then, ECU 15 carries out Wout restriction processing (step S70). By way of example, discharge allowable power Wout is limited when the SOC of power storage device 10 becomes low, as shown in FIG. 5. Alternatively, discharge allowable power Wout may be limited when the temperature of converter 110 rises or the like.

Then, ECU 15 determines whether starting of engine ENG is requested or not (step S80). When a determination is made that starting of engine ENG is requested (YES at step S80), ECU 15 further determines whether discharge allowable power Wout is currently increased or not (step S90). When a determination is made that discharge allowable power Wout is not currently increased (YES at step S90), ECU 15 executes the temporary-increasing processing of discharge allowable power Wout (step S100).

In other words, when a determination is made that discharge allowable power Wout is currently increased at step S90 (YES at step S90), a determination is made that temporary-increasing processing is not required since discharge allowable power Wout is already increased. Therefore, control proceeds to step S110 without executing step S100.

Figure 9:
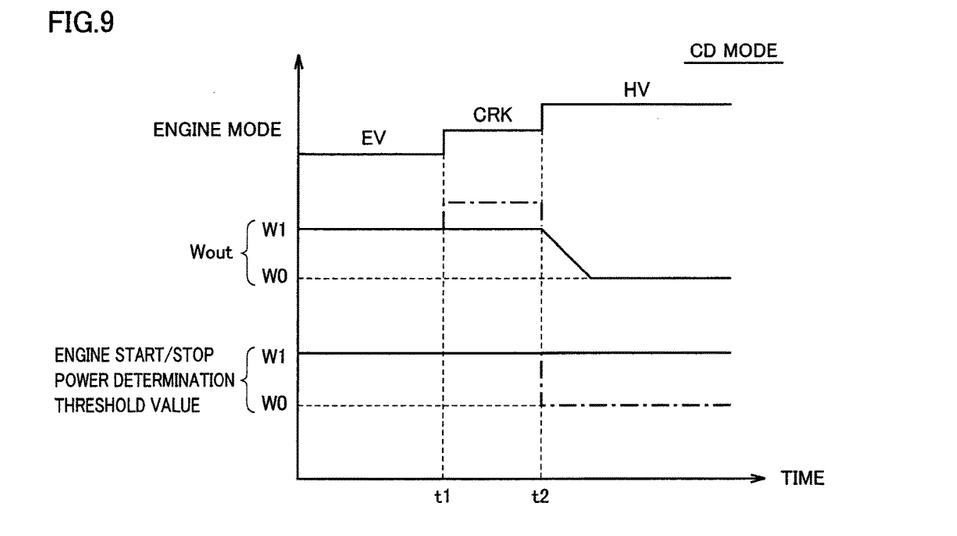
FIG. 9 represents the change in the discharge allowable power when the engine is to be started in a CD mode.
Figure 10:
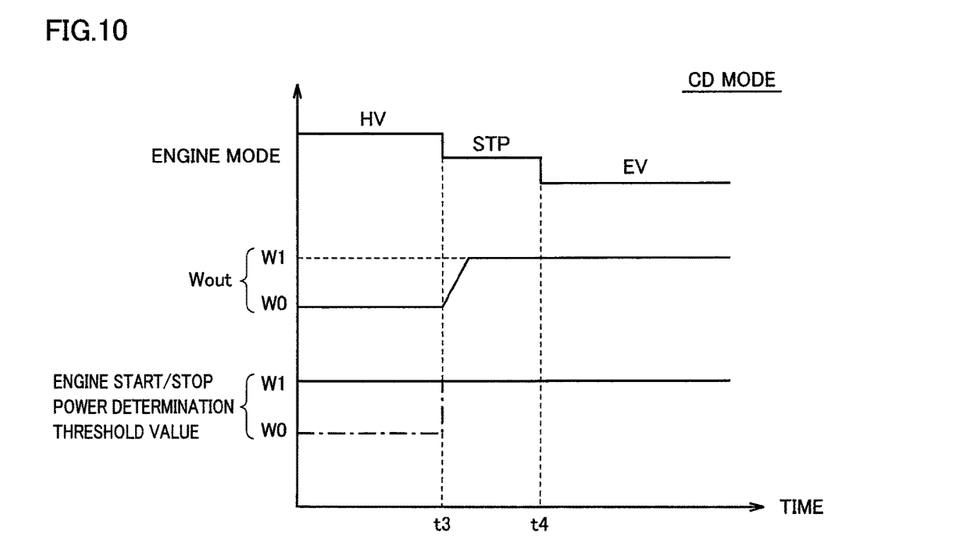
FIG. 10 represents the change in the discharge allowable power when the engine is to be stopped in a CD mode.
Figure 11:
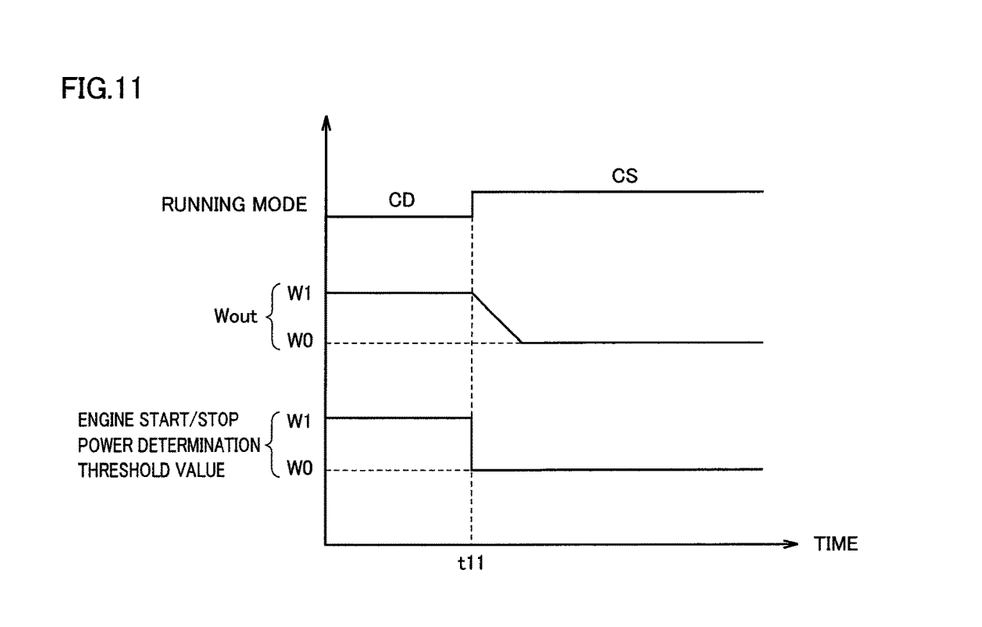
FIG. 11 represents the change in the discharge allowable power when the running mode is switched from a CD mode to a CS mode.

The change in discharge allowable power Wout according to various change in situation is shown in FIGS. 9-11.

FIG. 9 represents the change in discharge allowable power Wout when the engine is to be started in a CD mode. Referring to FIG. 9, "EV" of the engine mode refers to EV running with engine ENG stopped. "CRK" refers to receiving supply of electric power from power storage device 10 for engine ENG to be cranked by motor generator MG1. "HV" refers to HV running with engine ENG operated.

Prior to time t1, engine ENG is stopped (engine mode "EV"), and discharge allowable power Wout is increased to W1. Increase value W1 is also used for the engine start/stop power threshold value.

When the vehicle required power exceeds the engine start/stop power threshold value at time t1 in response to the accelerator pedal being pushed down or the like, engine ENG is cranked up (engine mode "CRK"). Since discharge allowable power Wout is already increased to W1, the temporary-increasing processing of discharge allowable power Wout in association with cranking of engine ENG is not executed.

When engine ENG is started at time t2 (engine mode "HV"), discharge allowable power Wout returns to W0 from W1. At this stage, the modifying rate of discharge allowable power Wout is limited to prevent the discharging power from exceeding discharge allowable power Wout due to a sudden reduction of discharge allowable power Wout.

The engine start/stop power threshold value is still at the increased value of W1, as set forth above, even if engine ENG is started. This facilitates the stopping of engine ENG after engine ENG has been started.

FIG. 10 represents the change in discharge allowable power Wout when the engine is stopped in a CD mode. Referring to FIG. 10, prior to time t3, engine ENG is operated (engine mode "HV"), and discharge allowable power Wout is at W0 (non-increase). As mentioned above, increased value W1 is employed for the engine start/stop power threshold value.

When the vehicle required power becomes lower than engine start/stop power threshold value (W1) at time t3, a stop processing of engine ENG is executed (engine mode "STP"). Accordingly, discharge allowable power Wout is increased from W0 to W1. Although the modifying rate of discharge allowable power Wout is limited when increased from W0 to W1, likewise the return to W0 from W1, the modifying rate at the time of increasing from W0 to W1 is greater than the modifying rate when returning to W0 from W1 to prevent a hold-off state of the vehicle caused by insufficient power.

FIG. 11 represents the change in discharge allowable power Wout when the running mode is switched from a CD mode to CS mode. Referring to FIG. 11, prior to time t11, it is assumed that the running mode is at the CD mode and engine ENG is stopped (EV running). Therefore, discharge allowable power Wout is increased to W1, and the increased value of W1 is employed for the engine start/stop power threshold value.

When the SOC of power storage device 10 reaches a threshold value Sth at time t11, the running mode is switched to the CS mode (FIG. 4). Accordingly, discharge allowable power Wout returns to W0 from W1. Similarly at this stage, the modifying rate of discharge allowable power Wout is limited to prevent exceedance of the discharging power over discharge allowable power Wout caused by a sudden reduction of discharge allowable power Wout.

In contrast to the CD mode in which the engine start/stop power threshold value is still at the increased value of W1 (FIG. 9) even when engine ENG was started, the engine start/stop power threshold value is switched to W0 here since the running mode is switched to the CS mode.

Figure 12:
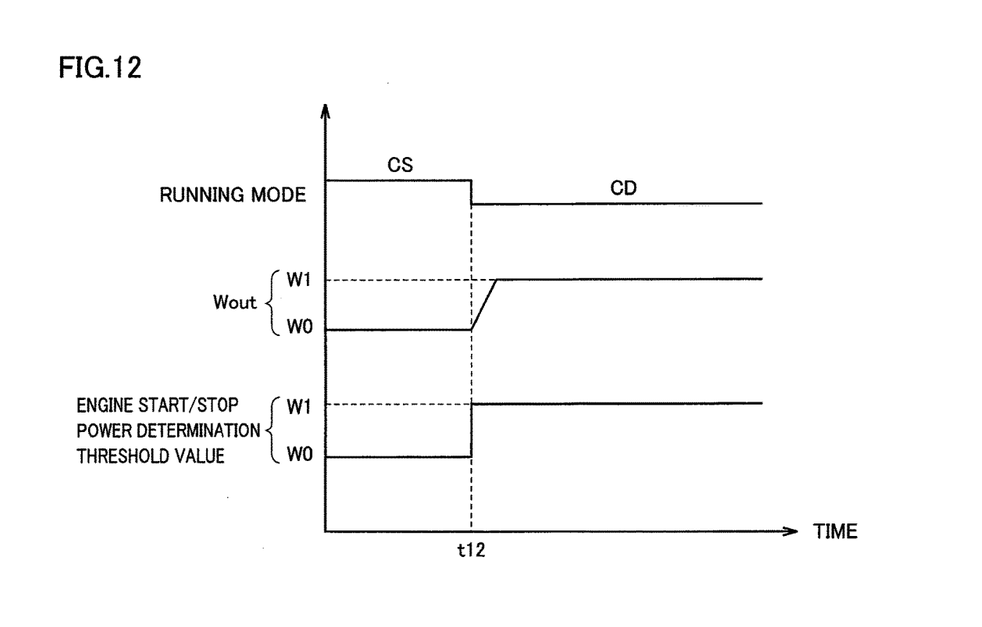
FIG. 12 represents the change in the discharge allowable power when the running mode is switched from a CS mode to a CD mode.

FIG. 12 represents the change in discharge allowable power Wout when the running mode is switched from a CS mode to CD mode. Referring to FIG. 12, the running mode is at the CS mode prior to time t12. Therefore, discharge allowable power Wout is W0 (non-increase), and W0 is used for the engine start/stop power threshold value.

When the running mode is switched to the CD mode at time t12, discharge allowable power Wout is increased from W0 to W1. It is assumed that engine ENG is stopped. Although the modifying rate of discharge allowable power Wout is limited at this stage, the modifying rate thereof is greater than when the running mode is switched from a CD mode to CS mode (FIG. 11) since discharge allowable power Wout is increased. The switching of the running mode to the CD mode causes the engine start/stop power threshold value to be switched to W1.

Figure 13:
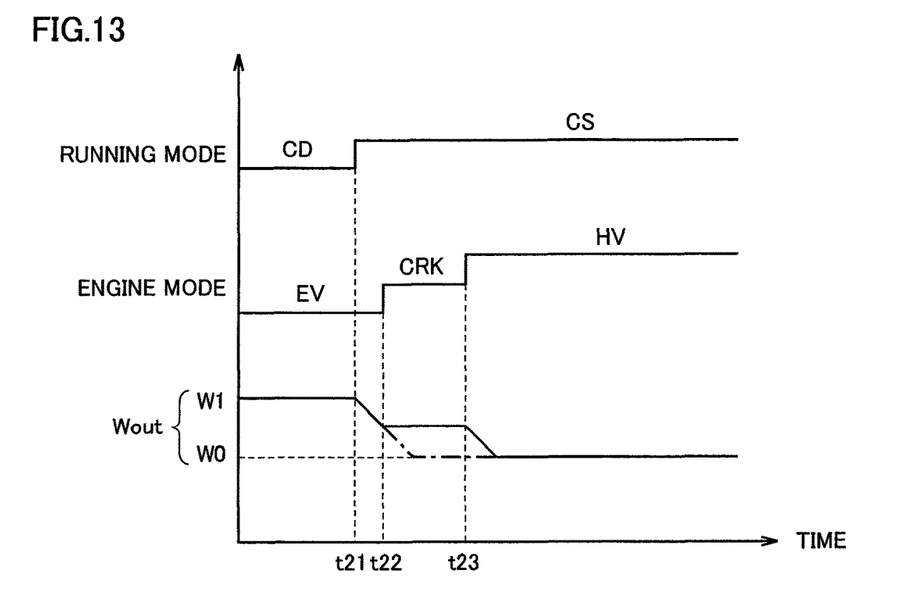
FIG. 13 represents the change in the discharge allowable power when the engine is to be started in association with switching the running mode from a CD mode to a CS mode.

FIG. 13 represents the change in discharge allowable power Wout when engine ENG is started in association with switching the running mode from a CD mode to CS mode. Referring to FIG. 13, it is assumed that the running mode is at the CD mode and engine ENG is stopped prior to time t21 (engine mode "EV"). Therefore, discharge allowable power Wout is increased to W1.

At time t22, the SOC of power storage device 10 reaches threshold value Sth, and the running mode is switched to the CS mode (FIG. 4). Accordingly, discharge allowable power Wout begins to return to W0 from W1 according to a predetermined modifying rate.

At time t22 during modification of discharge allowable power Wout, starting of engine ENG is requested, and engine ENG is cranked up (engine mode "CRK"). Accordingly, discharge allowable power Wout is maintained at the value corresponding to that of the point of time t22, during engine mode "CRK". When engine ENG is started and cranking of engine ENG ends at time t23 (engine mode "HV"), discharge allowable power Wout begins to change towards W0.

In the case where discharge allowable power Wout is lower than the value subsequent to Wout-increase by temporary-increase processing unit 164 (FIG. 3) at the point of time t22 when the cranking of engine ENG is started, discharge allowable power Wout may be maintained at the value subsequent to Wout-increase by temporary-increase processing unit 164 (FIG. 3).

In the present embodiment, discharge allowable power Wout is modified based on the running mode and operation/stop of engine ENG, as set forth above. Accordingly, when the running mode is at the CD mode and engine ENG is stopped, discharge allowable power Wout can be increased than when the running mode is at the CD mode and engine ENG is operating, or than when the running mode is at the CS mode. Therefore, the running power during EV running can be ensured, and increase of heat load on electrical components during operation of engine ENG and during a CS mode can be suppressed. According to the present embodiment, EV running can be extended while giving consideration to the heat load on electrical components.

In the present embodiment, a charging inlet 90 and charger 92 for external charging are provided. The running mode is set at the CD mode after external charging. Therefore, the present embodiment allows EV running using electric power by external charging to be extended.

Since a stop determination of engine ENG is carried out based on increased discharge allowable power Wout (W1) when the running mode is at the CD mode and engine ENG is operating in the present embodiment, the stopping of engine ENG is facilitated after engine ENG has been started in a CD mode. Therefore, the sense in EV running can be further improved by the present embodiment.

Moreover, since discharge allowable power Wout is maintained when engine ENG is to be started during modification of discharge allowable power Wout or at the time of switching the running mode in the present embodiment, the electric power output from power storage device 10 at the startup of engine ENG is stable. Therefore, the engine starting processing is stabilized in the present embodiment.

Moreover, the modifying rate when discharge allowable power Wout returns to W0 from W1 is set smaller than the modifying rate when discharge allowable power Wout is increased from W0 to W1 in the present embodiment. Therefore, the exceedance of the discharging electric power from power storage device 10 over discharge allowable power Wout caused by the delay in the followability of electric power control can be suppressed.

In other words, the modifying rate when discharge allowable power Wout is increased from W0 to W1 is set greater than the modifying rate when discharge allowable power Wout returns to W0 from W1 in the present embodiment. Therefore, the hold-off state of the vehicle caused by insufficient output when switching from the HV running to EV running in a CD mode can be prevented in the present embodiment.

When discharge allowable power Wout is currently increased by Wout control unit 154 in the present embodiment, the temporary-increasing processing of discharge allowable power Wout by temporary-increase processing unit 164 is set non-executable. Accordingly, discharge allowable power Wout can be prevented from being increased unnecessarily in the present embodiment.

The above embodiment has been described based on a configuration in which only one power storage device 10 and one converter 110 are provided. However, the present invention is also applicable to an electric system in which a plurality of power storage devices and converters are provided (for example, an electric system including a plurality of power storage devices, and a plurality of converters connected parallel thereto).

Furthermore, although the embodiment has been described in which external charging is carried out with an external power supply connected to charging inlet 90, external charging may be carried out by a non-contact feeding method such as by resonance, electromagnetic induction, and the like.

In the foregoing, engine ENG corresponds to an example of "internal combustion engine" of the present embodiment. Motor generator MG2 corresponds to an example of "electric motor" of the present invention. Engine start/stop determination unit 156 corresponds to an example of "determination unit" of the present invention. Wout control unit 154 corresponds to an example of "discharge allowable power control unit" of the present invention. Furthermore, charging inlet 90 and charger 92 constitute an example of "charging device" of the present invention.

It should be understood that the embodiments disclosed herein are illustrative and nonrestrictive in every respect. The scope of the present invention is defined by the terms of the claims, rather than the description of embodiment set forth above, and is intended to include any modification within the scope and meaning equivalent to the terms of the claims.

REFERENCE SIGNS LIST 10 power storage device;
15 ECU;
17 various sensor outputs;
20 PCU;
30 power output device;
35 accelerator pedal;
40 DG;
50L, 50R front wheel;
60L, 60R rear wheel;
70L, 70R front seat;
80 rear seat;
90 charging inlet;
92 charger;
100 hybrid vehicle;
105, 106 SMR;
110 converter;
120 capacitor;
131, 132 inverter;
140 converter/inverter control unit;
150 SOC calculation unit;
152 running mode control unit;
154 Wout control unit;
156 engine start/stop determination unit;
158 command generation unit;
160 charge control unit;
162 rate processing unit;
164 temporary-increase processing unit;
MG1, MG2 motor generator;
ENG engine.

The invention claimed is:
1. A control device for a hybrid vehicle,
said hybrid vehicle including
an internal combustion engine generating vehicle driving force,
a power storage device capable of being charged and discharged, and
an electric motor receiving supply of electric power from said power storage device for generating vehicle driving force,
said control device comprising:
a running mode control unit controlling switching of a running mode including a first mode in which said internal combustion engine is stopped and running using said electric motor alone is given priority, and a second mode in which said internal combustion engine is operated and a state of charge indicating a charging state of said power storage device is maintained at a predetermined target,
a determination unit carrying out a start determination of said internal combustion engine based on a discharge allowable power indicating electric power that can be discharged by said power storage device, a discharge allowable power control unit modifying said discharge allowable power based on said running mode and operation/stop of said internal combustion engine, and a rate processing unit modifying said discharge allowable power at a predetermined rate in modification of said discharge allowable power, wherein, when said running mode is at said first mode and said internal combustion engine is stopped, said discharge allowable power control unit increases said discharge allowable power than when said running mode is at said first mode and said internal combustion engine is operating, or than when said running mode is at said second mode, wherein a modifying rate of said discharge allowable power when said discharge allowable power returns from an increased state is smaller than the modifying rate of said discharge allowable power when said discharge allowable power is increased.

2. A control device for a hybrid vehicle,
said hybrid vehicle including
an internal combustion engine generating vehicle driving force,
a power storage device capable of being charged and discharged, and
an electric motor receiving supply of electric power from said power storage device for generating vehicle driving force,
said control device comprising:
a running mode control unit controlling switching of a running mode including a first mode in which said internal combustion engine is stopped and running using said electric motor alone is given priority, and a second mode in which said internal combustion engine is operated and a state of charge indicating a charging state of said power storage device is maintained at a predetermined target,
a determination unit carrying out a start determination of said internal combustion engine based on a discharge allowable power indicating electric power that can be discharged by said power storage device,
a discharge allowable power control unit modifying said discharge allowable power based on said running mode and operation/stop of said internal combustion engine, and
a rate processing unit modifying said discharge allowable power at a predetermined rate in modification of said discharge allowable power,
wherein, when said running mode is at said first mode and said internal combustion engine is stopped, said discharge allowable power control unit increases said discharge allowable power than when said running mode is at said first mode and said internal combustion engine is operating, or than when said running mode is at said second mode, and wherein a modifying rate of said discharge allowable power when said discharge allowable power is increased is greater than the modifying rate of said discharge allowable power when said discharge allowable power returns from an increased state.

3. A control device for a hybrid vehicle,
said hybrid vehicle including
an internal combustion engine generating vehicle driving force,
a power storage device capable of being charged and discharged, and
an electric motor receiving supply of electric power from said power storage device for generating vehicle driving force,
said control device comprising:
a running mode control unit controlling switching of a running mode including a first mode in which said internal combustion engine is stopped and running using said electric motor alone is given priority, and a second mode in which said internal combustion engine is operated and a state of charge indicating a charging state of said power storage device is maintained at a predetermined target,
a determination unit carrying out a start determination of said internal combustion engine based on a discharge allowable power indicating electric power that can be discharged by said power storage device, and
a discharge allowable power control unit modifying said discharge allowable power based on said running mode and operation/stop of said internal combustion engine,
wherein, when said running mode is at said first mode and said internal combustion engine is stopped, said discharge allowable power control unit increases said discharge allowable power than when said running mode is at said first mode and said internal combustion engine is operating, or than when said running mode is at said second mode,
a temporary-increase processing unit temporarily increasing said discharge allowable power when said internal combustion engine is started, and
wherein said temporary-increase processing unit sets processing of temporarily increasing said discharge allowable power non-executable when said discharge allowable power has been increased by said discharge allowable power control unit.

4. A hybrid vehicle including a control device defined in claim 1.

5. A hybrid vehicle including a control device defined in claim 2.

6. A hybrid vehicle including a control device defined in claim 3.

* * * * *